US008020185B2

(12) United States Patent
Zeng et al.

(10) Patent No.: US 8,020,185 B2
(45) Date of Patent: Sep. 13, 2011

(54) SYSTEM AND METHOD FOR RETRIEVING DIGITAL MULTIMEDIA CONTENT FROM A NETWORK NODE

(75) Inventors: Thomas Zeng, San Diego, CA (US); Michael Foster, San Diego, CA (US); Michael Severa, Pasadena, CA (US); Cheuk Chan, La Jolla, CA (US); P. Greg Sherwood, San Diego, CA (US); Wei Wu, San Diego, CA (US); David Kosiba, Jamul, CA (US)

(73) Assignee: Alcatel Lucent, Paris (FR)

( * ) Notice: Subject to any disclaimer, the term of this patent is extended or adjusted under 35 U.S.C. 154(b) by 262 days.

(21) Appl. No.: 10/598,556

(22) PCT Filed: Mar. 3, 2005

(86) PCT No.: PCT/US2005/007145
§ 371 (c)(1),
(2), (4) Date: Sep. 5, 2006

(87) PCT Pub. No.: WO2005/084381
PCT Pub. Date: Sep. 15, 2005

(65) Prior Publication Data
US 2007/0171903 A1    Jul. 26, 2007

(51) Int. Cl.
*H04N 7/173* (2006.01)
*G06F 15/16* (2006.01)

(52) U.S. Cl. ........... 725/86; 725/91; 725/92; 725/93; 725/97; 725/114; 709/217; 709/219

(58) Field of Classification Search ............ 725/86, 725/91–93, 97, 114; 709/217, 219
See application file for complete search history.

(56) References Cited

U.S. PATENT DOCUMENTS

| 5,996,015 | A   |   | 11/1999 | Day et al. ............... 709/226 |
| 6,441,832 | B1  | * | 8/2002  | Tao et al. ............... 715/723 |
| 6,741,996 | B1  | * | 5/2004  | Brechner et al. ............ 1/1 |
| 7,277,955 | B2  | * | 10/2007 | Elliott ................... 709/231 |

(Continued)

FOREIGN PATENT DOCUMENTS

GB    2 328 105 A    2/1999

(Continued)

OTHER PUBLICATIONS http://www.faqs.org/rfcs/rfc2326.html RFC 2326—Real Time Streaming Protocol (RTSP), (Apr. 1998), by H. Schulzrinne.*

(Continued)

*Primary Examiner* — William Trost, IV
*Assistant Examiner* — Gigi L Dubasky
(74) *Attorney, Agent, or Firm* — Capitol Patent & Trademark Law Firm, PLLC

(57) ABSTRACT

A scheme for retrieving digital multimedia content from a network node. A message is provided to the network node by a client application executing on a digital multimedia device, wherein the message includes a multidimensional pointer to a depository of digital multimedia content associated with the network node as well as a timing parameter operable to indicate when the message is to take effect. The multidimensional pointer contains a relative time offset variable as well as a plurality of media identifier dimensions corresponding to a plurality of nested hierarchical levels into which the digital multimedia content is organized. Responsive to the message, content from a particular content source identified by the multidimensional pointer is streamed to the digital multimedia device at a time indicated responsive to the timing parameter.

21 Claims, 9 Drawing Sheets

U.S. PATENT DOCUMENTS

| | | | |
|---|---|---|---|
| 2002/0164973 A1 | 11/2002 | Janik et al. | 455/403 |
| 2003/0018615 A1* | 1/2003 | Chaudhuri et al. | 707/1 |
| 2003/0236905 A1 | 12/2003 | Choi et al. | |
| 2005/0071881 A1* | 3/2005 | Deshpande | 725/88 |
| 2005/0128508 A1* | 6/2005 | Greeff et al. | 358/1.15 |

FOREIGN PATENT DOCUMENTS

| | | |
|---|---|---|
| WO | 00/59228 A1 | 10/2000 |

OTHER PUBLICATIONS

PCT International Search Report; International Application No. PCT/US05/07145; Search Completed Oct. 11, 2005; Search Mailed Nov. 10, 2005; one page.

Request for Comments (RFC) 2326; Network Working Group; "Real Time Streaming Protocol (RTSP)"; Schulzrinne, et al.; Apr. 1998; pp. 1-92.

* cited by examiner

CLIENT PLAYLIST_PLAY REQUEST

```
PLAYLIST_PLAY rtsp://example.com/public/foo RTSP/1.0
CSeq: 7
Session: 1234567890
Range: playlist_play_time=</foo1.ply, 6, 0>-; time=now
```
— 802

STREAMING MODULE RESPONSE

```
RTSP/1.0 200 OK
CSeq: 7
Session: 1234567890
Range: playlist_play_time=</foo1.ply, 6, 0>-
```
— 804

STREAMING MODULE SET_PARAMETER REQUEST

```
SET_PARAMETER rtsp://example.com/public/foo RTSP/1.0
CSeq: 8
Session: 1234567890
Content-length: 24
Content-type: text/parameters playlist_play_time=</foo1.ply, 6, 0>
presentation_npt_time: 65000
```
— 806

CLIENT RESPONSE

```
RTSP/1.0 200 OK
CSeq: 8
Session: 1234567890
```
— 808

*FIG. 8*

| Symptoms 902 | Return Code 904 | Behavior 904 |
|---|---|---|
| Everything okay | OK | Begins streaming from the specified clip/playlist |
| Playlist file not found | Not Found | Continues streaming from current playlist |
| Playlist file corrupt | Internal Server Error | Continues streaming from current playlist |
| Not authorized for secure playlist file | Unauthorized | Continues streaming from current playlist |
| Public playlistw/ secure content | Forbidden | Continues streaming from current playlist |
| Clip index value out of range | Invalid Range | Continues streaming from current playlist |
| Clip(s) not found | Partial Content | Begins streaming from next available (found) clip defined in the playlist. Indicated by clip index in response range header. |
| Playlist found but all clips missing | Requested Range Not Satisfiable | Continues streaming from current playlist |
| Clip corrupt | Handled in the error code of the following S→C SET_PARAMETER request | |

FIG. 9

SYSTEM AND METHOD FOR RETRIEVING DIGITAL MULTIMEDIA CONTENT FROM A NETWORK NODE

BACKGROUND OF THE INVENTION

1. Technical Field of the Invention

The present invention generally relates to media streaming over a network. More particularly, and not by way of any limitation, the present invention is directed to a system and method for retrieving digital multimedia content from a network node in a client-server architecture.

2. Description of Related Art

With today's widespread use of the Internet as a major communication medium, computer networks are increasingly being used to transmit multimedia data (e.g., audio, full-motion video, pictures, et cetera). In the network-based context, one simple model of producing the information involves a client device requesting the downloading of the multimedia data from a server. Once downloaded, the client may then consume, or present, the information. This model is relatively easy to implement; however, it is non-optimal in that the client is required to wait for the downloading to complete before the presentation can begin. This delay can be considerable where large blocks of multimedia data are involved.

A more sophisticated model of producing information involves a content server at one network site "streaming" the multimedia information over the network to a client at another site. Streaming is a process in which packets, sent over an Internet Protocol (IP)-based network, are used to present material continuously to a recipient client as it arrives in substantially real time as perceived by the user. As such the client does not have to download and store a large file before displaying the material. That is, the client begins to present the information as it arrives (i.e., just-in-time rendering), rather than waiting for the entire data set to arrive before beginning presentation. Accordingly, at the client device, received data is buffered into a cache memory and continuously processed as soon as, or soon after, being received by the client for real time presentation of multimedia content.

Most streaming sessions include either live or video-on-demand (VOD) sources, and are typically associated with a single content source (i.e., a single VOD file or a single live source, e.g., a video camera). However, by adding the ability to combine sources into a single streaming session, much richer applications can be built based on multimedia streaming.

A "playlist" in its simplest form is just a list of media which could be used to simply manage playback of local content (i.e., audio files) or to control the streaming media sessions. When used in the context of multimedia streaming, playlists provide an extensible, dynamic method for delivering customizable audio and video content to users via streaming. A playlist represents a list of the media items that a server can stream to a client, which can include a mixture of program content and advertisements (ads), for example. Also, a playlist can be used to play several short clips or to provide a user with long blocks of programming.

In a client-server streaming architecture, two types of playlists may be provided: client-side playlists and server-side playlists. The main difference between the two types of playlists is that when the client-side playlists are used, a client player application has control of the streaming experience, whereas when server-side playlists are used, a streaming server has control of the streaming experience. Server-side playlists provide the ability for the streaming server to combine streams from multiple sources (in sequence) and stream to a client in a single session. The client need not (and may not even) be aware that there are multiple media sources. This is useful for providing ad insertion capability, or for applications where uninterrupted streaming (from multiple sources) is desired—i.e., where the client doesn't have to explicitly request streaming from each new source.

One of the issues when utilizing server-side playlists is to support dynamic playlist navigation, which is advantageous in providing the end-user with a compelling and useful user experience. Additionally, the playlist navigation functionality must be accomplished with minimal impact on the client device application due to significant client device resource constraints. Existing server-side playlist schemes, however, are deficient in that they do not support client-side navigational control of playlist seeking.

SUMMARY OF THE INVENTION

In one aspect, the present invention is directed to a method for retrieving digital multimedia content from a network node, comprising: generating a message to the network node by a client application executing on a digital multimedia device, the message containing at least one of a multidimensional pointer to a depository of digital multimedia content associated with the network node and a timing parameter operable to indicate when the message is to take effect; and transferring digital multimedia content to the digital multimedia device by the network node from a particular content source identified by the multidimensional pointer, the transferring commencing at a time indicated responsive to the timing parameter.

In another aspect, the present invention is directed to a system for retrieving digital multimedia content from a network node, comprising: means associated with a client application executing on a digital multimedia device for generating a message to the network node, the message containing at least one of a multidimensional pointer to a depository of digital multimedia content associated with the network node and a timing parameter operable to indicate when the message is to take effect; and means for transferring digital multimedia content to the digital multimedia device by the network node from a particular content source identified by the multidimensional pointer, the transferring commencing at a time indicated responsive to the timing parameter.

In yet another aspect, the present invention is directed to a digital multimedia device operable to retrieve digital multimedia content from a network node, comprising: logic for generating a message to the network node by a client application executing on the digital multimedia device, the message containing at least one of a multidimensional pointer to a depository of digital multimedia content associated with the network node and a timing parameter operable to indicate when the message is to take effect; and a player engine operable to play back streaming content from a particular content source identified by the multidimensional pointer, the streaming content commencing at a time indicated responsive to the timing parameter.

In a further aspect, the present invention is directed to a network node operable to stream digital multimedia content to a digital multimedia device, comprising: a depository of digital multimedia content organized into a nested hierarchical arrangement having a plurality of levels; logic for processing a message transmitted by a client application executing on the digital multimedia device, the message containing a multidimensional pointer to the depository of digital multimedia content as well as a timing parameter operable to indicate when the message is to take effect, wherein the multidimensional pointer comprises a plurality of media identifier dimensions that correspond to the plurality of nested hierarchical levels of the multimedia in addition to a relative time offset within a particular block of media disposed at the lowest level; and logic for streaming content to the digital multimedia device from a particular content source identified by the multidimensional pointer, the streaming content commencing at a time indicated responsive to the timing parameter.

BRIEF DESCRIPTION OF THE DRAWINGS

The accompanying drawings are incorporated into and form a part of the specification to illustrate one or more presently preferred exemplary embodiments of the present invention. Various advantages and features of the invention will be understood from the following Detailed Description taken in connection with the appended claims and with reference to the attached drawing figures in which:

FIG. 8 depicts request/response syntax structure associated with an exemplary PLAYLIST_PLAY procedure for switching to a server-side playlist content source according to an embodiment of the present invention; and FIG. 9 depicts a table of exemplary return codes associated with the PLAYLIST_PLAY procedure according to an embodiment of the present invention.

DETAILED DESCRIPTION OF THE DRAWINGS

Figure 1:
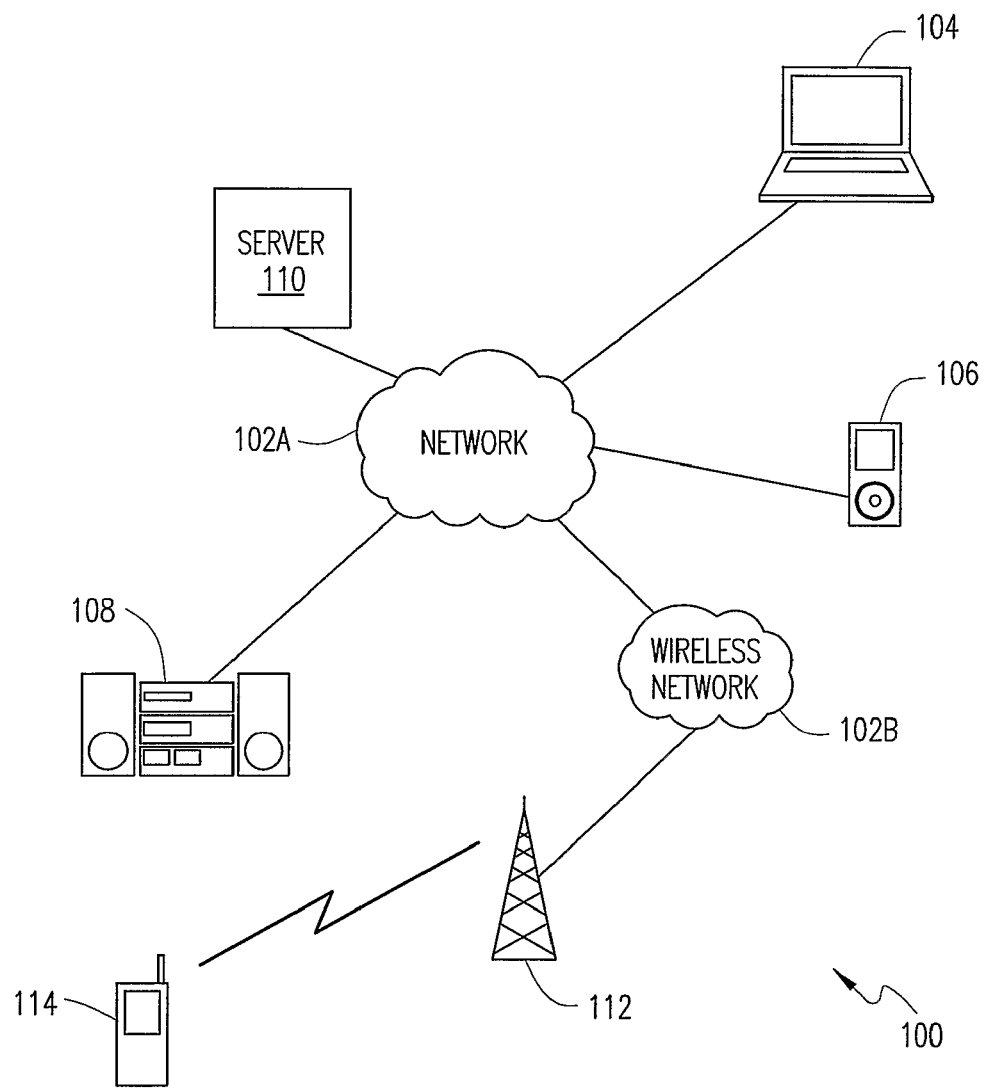
FIG. 1 depicts an exemplary network environment in which an embodiment of the present invention may be practiced.

Embodiments of the invention will now be described with reference to various examples of how the invention can best be made and used. Like reference numerals are used throughout the description and several views of the drawings to indicate like or corresponding parts, wherein the various elements are not necessarily drawn to scale. Referring now to the drawings, and more particularly to FIG. 1, depicted therein is an exemplary network environment 100 in which an embodiment of the present invention maybe practiced. Reference numerals 102A and 102B are illustrative of a network infrastructure that can include, among others, any wireline, wireless, satellite, or cable network arrangement, or a combination thereof, that can support transfer of digital multimedia content from a server node 110 to various client devices capable of accepting such content over a client-server network architecture. In one implementation, network 102A may comprise a public packet-switched network such as the Internet that is accessible via suitable access means including both narrowband (e.g., dial-up) and broadband (e.g., cable, digital subscriber line or DSL, etc.) access mechanisms. Alternatively, network 102A maybe implemented as a private enterprise-level intranet. Wireless network 102B may be implemented as a wireless packet data service network such as the General Packet Radio Service (GPRS) network that provides a packet radio access for mobile devices using the cellular infrastructure of a Global System for Mobile Communications (GSM)-based carrier network. In still further implementations, the wireless network 102B may comprise any known or heretofore unknown $3^{rd}$ Generation Partnership Project (i.e., 3GPP, 3GPP2, etc.) network operable to serve Internet Protocol (IP)-capable handheld devices, e.g., a mobile client device 114, using appropriate wireless infrastructure 112 that includes, among others, short-range wireless fidelity (WiFi) access points (APs) or "hot spots." As will be seen hereinbelow, the embodiments of the present patent application for retrieving server-based digital multimedia content by a client device will be described regardless of any particular wireless or wireline network implementation of the networks 102A, 102B.

Although the server node 110 is illustrated as a single node coupled to the network 102A, its functionality may be distributed among a plurality of nodes depending on the underlying streaming media architecture. Exemplary client devices can be thick or thin clients, with varying levels of processing power, operable execute appropriate streaming client applications that can include Java applications, plug-ins, etc. Client devices may comprise portable computers, laptops, handheld computers, desktop computers, generically represented as computers 104, network-aware audio/video (A/V) devices such as digital music players, digital video players, etc., generally represented as A/V components 108, or specialized multimedia devices 106 such as iPod™ devices and the like. Further, as alluded to before, client devices can also include mobile client devices (e.g., device 114) that are capable of accepting and playing digital multimedia content.

Figure 2:
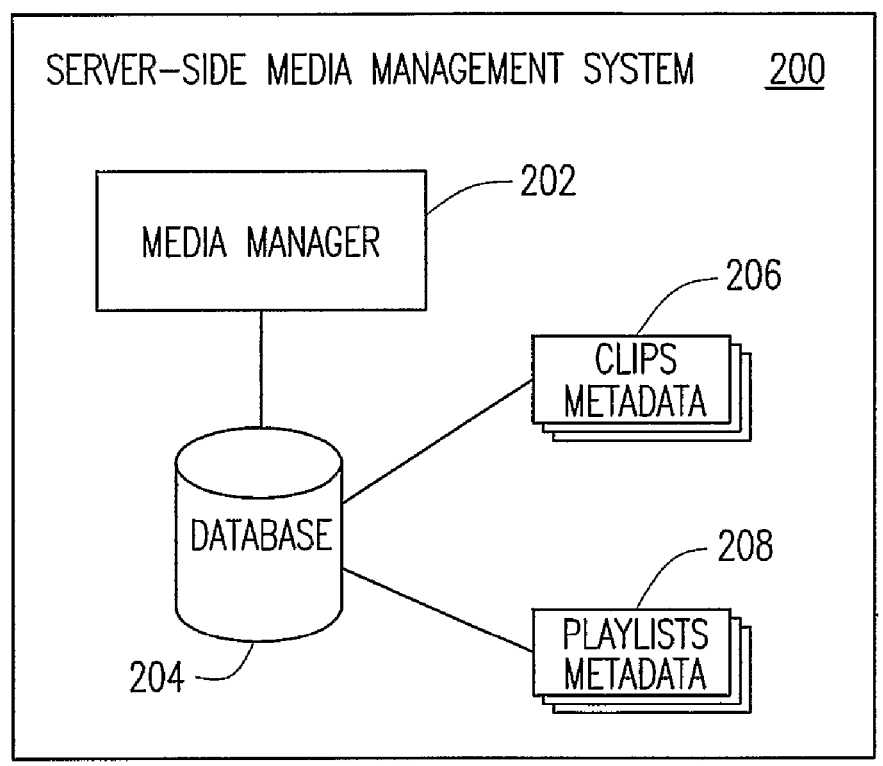
FIG. 2 depicts an exemplary embodiment of a server-side media management system operable in accordance with an embodiment of the present invention.

FIG. 2 depicts an exemplary embodiment of a server-side media management system 200 associated with a server (e.g., the server node 110) in accordance with an embodiment of the present invention. The server-side media management system 200 may include a media manager 210 and a digital multimedia content database 204 wherein the media manager 210 controls access to the database 204. In one implementation, the media manager 210 receives requests from a client application executing on a digital multimedia device, accesses the content database, and returns responses to the client application. As will be described below, the database 204 serves as a depository of digital multimedia content that is organized into a nested hierarchical arrangement having a plurality of levels based on parameters that are used to classify, identify and/or describe media (i.e., media items) in the database 204. For instance, the digital multimedia content associated with the server may contain music files that can be streamed over the network under control of a suitable text-based protocol such as the Real-Time Streaming Protocol (RTSP). It should be appreciated that other media files may comprise any form of digital media, which can include sound files, picture data, movies, text files or any other types of media that can be digitally stored on a computer. Accordingly, server-side playlists can be generalized to media collections, including collections of mixed digital media, each playlist including one or more individual multimedia files or clips. The media manager 202 has or can obtain information about the database 204 that may, for example, include the name of the server, the version of the database being used, the type of security that is required, the number of databases available to the server, whether non-standard media types are supported, whether persistent identification is supported, etc. Those skilled in the art should appreciate that the information about the database 204 may exist in a single record file or can be either partially or fully generated on demand, identifying the various pieces of information as needed. One or more metadata files 206 contain metadata about each media item available in the database 204. Byway of illustration, where the media item is a song, the metadata might include, for example, the names or titles of songs, an identification number, a persistent identification number, the artist, the album, the size of the song, the format of the song, the required bit rate, and any other appropriate information, which may depend on the type of media. A video file might have additional fields, e.g., director and producer fields, actor and actress fields, etc. Still pictures may not need bit rate information. While some fields may be standard, others may be specific to certain applications. For example, a video signal may have secondary audio program (SAP) information in addition to other video-related metadata information.

The playlist records 208 contain information about each playlist available in the database 204, wherein the playlists are typically comprised of collections of media clips that may or may not be in any particular order. Users may choose to combine media by genre, mood, artists, directors/producers, audience, or any other meaningful arrangement. While the playlists on the server 110 will usually only include media clips contained in its own music database 204, it is also possible that the playlist records 208 may include multimedia clips or playlists stored on other servers, depending upon the implementation of the server-side media management system 200.

Figure 3:
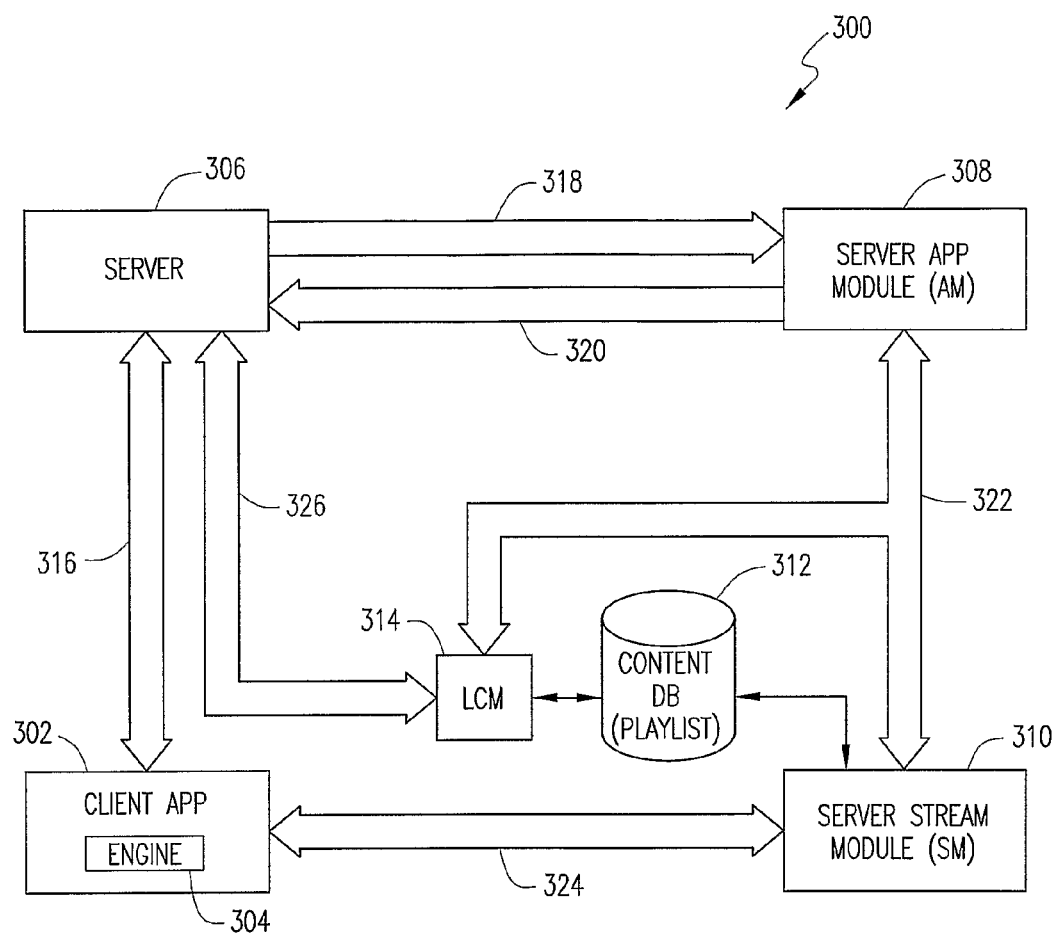
FIG. 3 depicts a block diagram of a client-server arrangement operable in a network environment for streaming digital multimedia content in accordance with an embodiment of the present invention.

FIG. 3 depicts a block diagram of an exemplary client-server arrangement 300 operable in a network environment for streaming digital multimedia content in accordance with an embodiment of the present invention, wherein the server-side architecture is distributed among a plurality of interoperable modules. Those skilled in the art should recognize that the client-server arrangement 300 is one illustrative implementation involving the server node 110 and a client device described hereinabove with respect to FIG. 1 and FIG. 2. A streaming client application 302 executing on any appropriate digital multimedia device is operable to interact with a web server 306 with respect to user requests and user feedback provided via path 316. Associated with the client application 302 is a media player engine 304, which maybe embodied in software, hardware, firmware, or any combination thereof, for playing back the streaming media received over a streaming session. Web server 306 includes logic structure and functionality to invoke a presentation description by making a metadata file creation request 318 to a server application module (AM) 308 that generates a Session Description Protocol (SDP) file for a particular playlist. In general, a presentation description may describe one or more presentations, each of which maintaining a common time axis. A single presentation may contain several media streams whose description includes encoding information, language, and other parameters that enable the client application to choose the most suitable combination of media. Where multiple media streams are involved, it is possible that they may be located on different media servers; for example, audio and video streams can be split across servers for load sharing.

By way of example, a server streaming module (SM) 310, associated content database 312 and a local content manager (LCM) 314 are representative of a media server for streaming digital multimedia to the client player engine 304 via a real-time media delivery path 324 that is effectuated via a transport protocol such as Real-time Transport Protocol (RTP). Streaming events are notified to the server AM 308 by the streaming module via path 322 and streaming session status updates are provided by the server AM module 308 to the web server 306 via path 320. The web server 306 is operable to interact with the LCM via a path 326 with regard to playlist and media content management and playlist identifiers (e.g., Uniform Resource Locators or URLs).

As alluded to hereinabove, control over the delivery of data with real-time properties (i.e., digital multimedia) in the client-server arrangement 300 may be effectuated by an application-level text-based protocol such as RTSP which is operable to control multiple data delivery sessions, provide a means for choosing delivery channels such as User Datagram Protocol (UDP) channels, multicast UDP channels, etc., as well as provide a means for choosing data delivery mechanisms based upon RTP. Since the teachings of the present patent disclosure are particularly exemplified within the context of RTSP messaging, a brief description thereof is set forth immediately below.

RTSP establishes and controls one or more time-synchronized streams of continuous media such as audio and video, wherein the set of streams to be controlled is defined by a presentation description. There is no notion of an RTSP connection; instead, a server maintains a logical session typically labeled by an identifier. In general, an RTSP session is not tied to a transport-level connection such as the Transmission Control Protocol (TCP). During an RTSP session, an RTSP client application may open and close a number of TCP transport connections to the server to issue RTSP requests. Alternatively, it may use a connection less transport protocol such as UDP.

A "presentation" is a set of one or more streams presented to the client as a complete media feed, using presentation description information. In most cases within the RTSP context, this implies aggregate control of those streams, but not necessarily so. A presentation description contains information about one or more media streams within a presentation, such as the set of encodings, network addresses and other information about the content. Other Internet Engineering Task Force (IETF) protocols such as SDP use the term "session" to describe a live presentation. The presentation description may take several different formats, including but not limited to the SDP-based session description format alluded to hereinabove.

The streams controlled by RTSP may use RTP for data delivery, but the operation of RTSP does not depend on the transport mechanism used to carry continuous media. RTSP's syntax and operation are similar to that of the more familiar Hypertext Transfer Protocol (HTTP), although several important distinctions between the two exist. For example, both an RTSP server and client can issue requests, whereas HTTP is an asymmetric protocol in which the client issues requests and the server responds. Also, with respect to RTSP, data is typically carried out-of-band by a different protocol (e.g., RTP). The following operations are supported by RTSP: (i) retrieval of media from a media server; (ii) invitation of a media server to a conference; and (iii) addition of media to an existing presentation.

In terms of overall operation, each presentation and media stream may be identified by an RTSP URL. For example, the RTSP URL:

rtsp://media.example.com:554/twister/audiotrack identifies the audio stream within the presentation "twister", which can be controlled via RTSP requests issued over a TCP connection to port 554 of host <media.example.com>. As pointed out earlier, the presentation and the properties of the media are defined by a presentation description file, which may be obtained by a client application using HTTP or other means such as email and RSTP DESCRIBE requests, and may not necessarily be stored on the media server. The following table summarizes the RTSP method tokens that indicate the particular method to be performed on the resource identified in a request message:

TABLE I

| Method | Direction | Object |
|---|---|---|
| DESCRIBE | Client (C) to Server (S) | Presentation (P); Stream (S) |
| ANNOUNCE | C to S; S to C | P; S |
| GET_PARAMETER | C to S; S to C | P; S |
| OPTIONS | C to S; S to C | P; S |
| PAUSE | C to S | P; S |
| PLAY | C to S | P; S |
| RECORD | C to S | P; S |
| REDIRECT | S to C | P; S |
| SETUP | C to S | S |
| SET_PARAMETER | C to S; S to C | P; S |
| TEARDOWN | C to S | P; S |

Each of these methods, whether applied on a single stream or a group of streams (i.e., a presentation), is typically provided with a number of header fields that are used for further defining the RTSP transactions in a client-server arrangement. Additional details regarding these and related RTSP requirements maybe found in IETF Request for Comments (RFC) 2326, "Real Time Streaming Protocol (RTSP)" by Schulzrinne et al. (dated April 1998), which is incorporated by reference herein.

It should be appreciated that RTSP is versatile enough to provide for extensions, either by way of extending existing methods with new parameters or by defining new methods that are designed to impart enhanced functionality. As will be seen below, the present patent disclosure provides a new method that enables increased playlist seeking capabilities with respect to server-side playlists within a client-server arrangement such as, e.g., the arrangement 300 described above.

Figure 4:
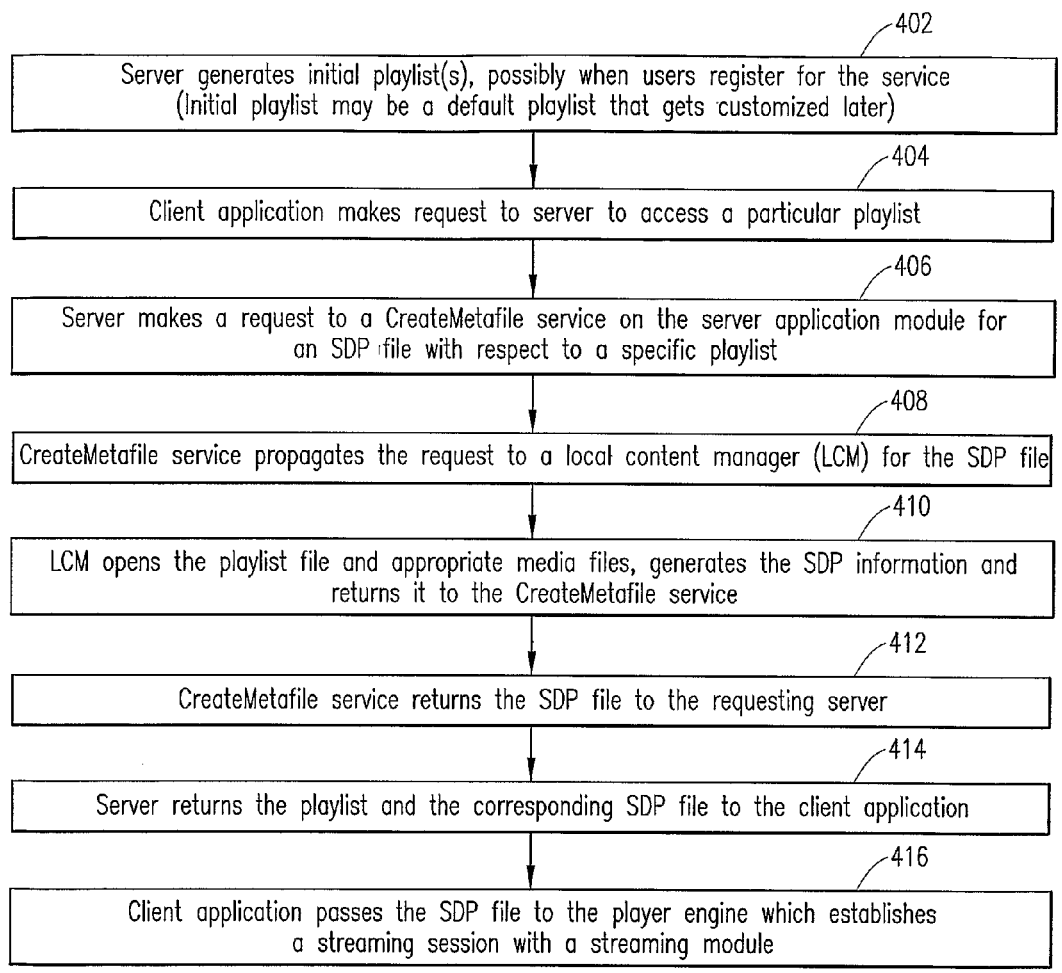
FIG. 4 is a flowchart of one aspect of operation with respect to the client-server arrangement shown in FIG. 3.

Referring now to FIG. 4, shown therein is a flowchart of one aspect of operation with respect to the client-server arrangement 300 shown in FIG. 3. The web server 306 is operable to generate initial playlists, possibly when users register for the service (block 402). In one implementation, the initial playlist may simply be a default playlist that gets customized later. The client application 302 makes a request to the web server 306 to access a particular playlist (block 404), whereupon the server 306 makes a request to a CreateMetafile service on the server application module 308 for an SDP file with respect to a specific playlist (block 406). The CreateMetafile service thereafter propagates the request to LCM 314 for the SDP file (block 408). Those skilled in the art should appreciate that the SDP file contains data that would have been obtained via an RTSP DESCRIBE request, as well as additional information, so the client application 302 does not have to issue a separate RTSP DESCRIBE request. Responsive to the SDP file, LCM 314 opens the playlist file and appropriate media file(s), generates the SDP information, and returns it to the CreateMetafile service (block 410) which passes the SDP file to the requesting web server 306 (block 412). Subsequently, the web server 306 returns the playlist (generated previously) and the corresponding SDP file to the client application 302 executing on the digital multimedia device (block 414). The client application 302 passes the SDP file to the player engine 304 which establishes a streaming session with the streaming module 310 for accepting the delivery of selected media (block 416). Where audio files are involved, for example, they may be encoded in a number of ways, such as Advanced Audio Coding (AAC), Windows® Media Audio (WMA), MP3, etc.

In a further variation, LCM 314 might not be involved in generating an SDP file. Instead, the CreateMetafile service makes a request directly to a streaming server (via RTSP DESCRIBE) to receive abase SDP description. Thereafter, the CreateMetafile service modifies the received SDP description to make it appropriate for client consumption. Additionally, the playlist file is not necessarily delivered to the client application along with the SDP file in all cases. In one embodiment where the client application understands the syntax of the playlist file, a playlist may be provided in addition to the SDP file, thereby allowing a much richer user experience and interaction with the client. In the case where the client may be totally unaware of playlists altogether, it would receive only an SDP file.

Figure 5:
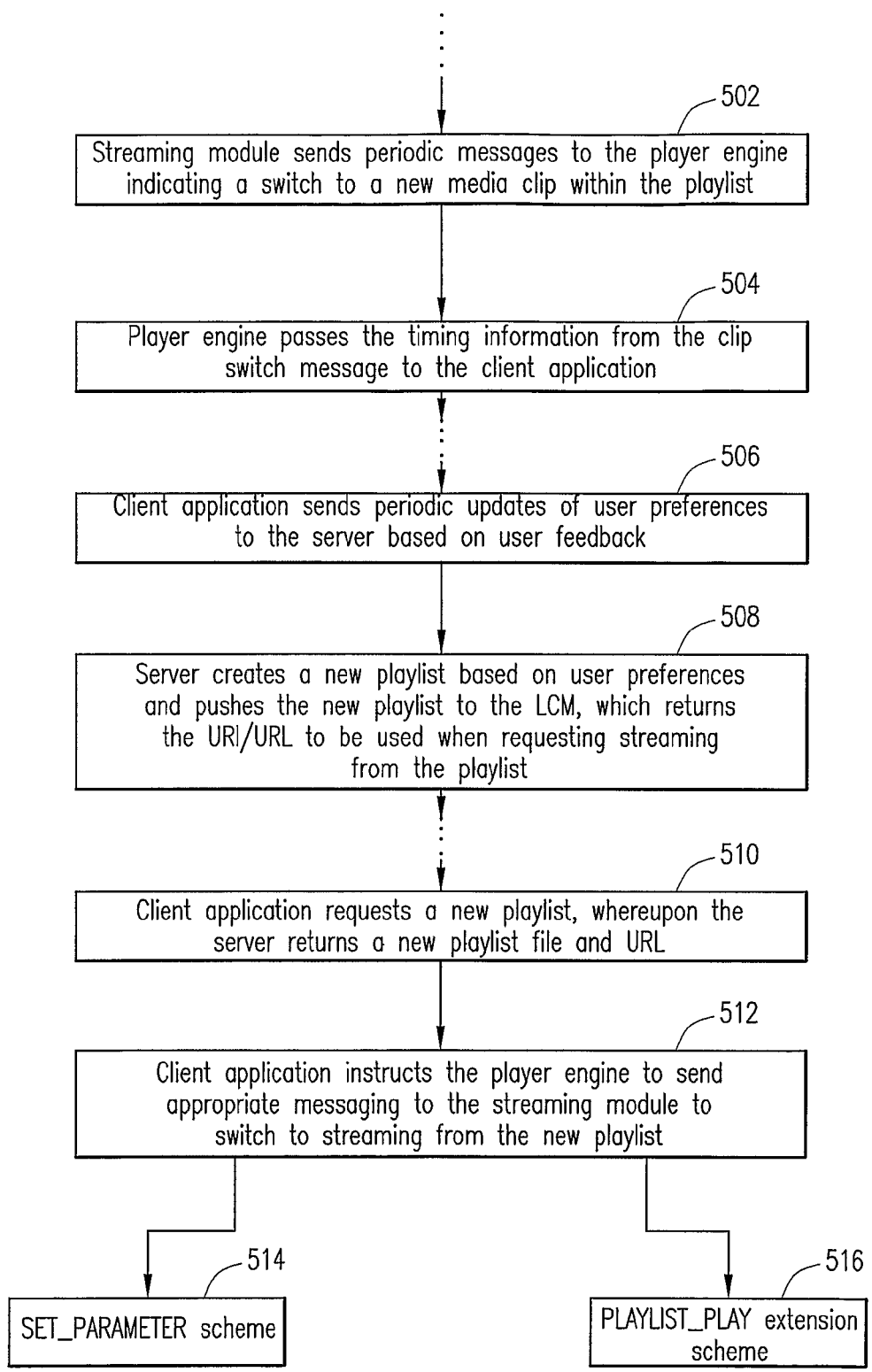
FIG. 5 is a flowchart of further aspects of operation with respect to the client-server arrangement shown in FIG. 3.

FIG. 5 is a flowchart of further aspects of operation with respect to the client-server arrangement shown in FIG. 3. The server-side streaming module 310 is operable to send periodic messages (e.g., SET_PARAMETER messages in RTSP) to the player engine 304, indicating a switch to a new media clip within a selected playlist or to a new playlist altogether (block 502). Responsive thereto, the player engine 304 passes the timing information in the clip switch messages to the client application 302 to coordinate media synchronization operations for display to the user (block 504). Additionally, the client application 302 may also send periodic updates of user preferences to the web server 306 based on user feedback (block 506). Responsive thereto, the web server 306 creates a new playlist based on user preferences and pushes the same to the LCM. Thereafter, the LCM returns the URL to be used when requesting streaming from this new playlist (block 508). In a further aspect, the client application 302 is operable to request streaming from a new playlist, whereupon the web server 306 returns the playlist URL and may optionally return a new playlist file as well (block 510). Responsive thereto, the client application 302 instructs the player engine 304 to send appropriate messaging to the streaming module 310 to switch to streaming from the new playlist (block 512). As illustrated in FIG. 5, two exemplary embodiments may be provided for effectuating server-side playlist switching: an RTSP SET_PARAMETER scheme which defines new additional parameters in a SET_PARAMETER message (block 514), and a new method, called PLAYLIST_PLAY, that defines a novel extension scheme for the existing RTSP methodology (block 516). The SET_PARAMETER scheme is described in a related co-pending commonly assigned patent application 10/598,551 entitled "SYSTEM AND METHOD FOR RETRIEVING DIGITAL MULTIMEDIA CONTENT FROM A NETWORK NODE," filed even date herewith which is incorporated by reference herein and will not be specifically elaborated in additional detail in the present patent disclosure. The PLAYLIST_PLAY extension scheme involving a multidimensional pointer system that includes a relative offset timing variable in a multidimensional m-tuple is set forth below in the following sections of the Detailed Description.

Figure 6A:
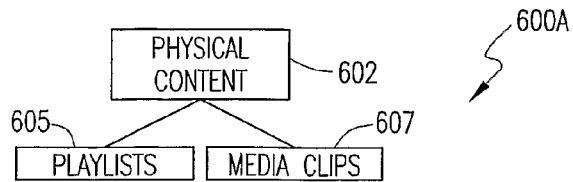
FIGS. 6A-6C depict various aspects of an exemplary nested hierarchical arrangement of digital multimedia content associated with a network node that is accessed using a multidimensional pointer system of the present invention.
Figure 6B:
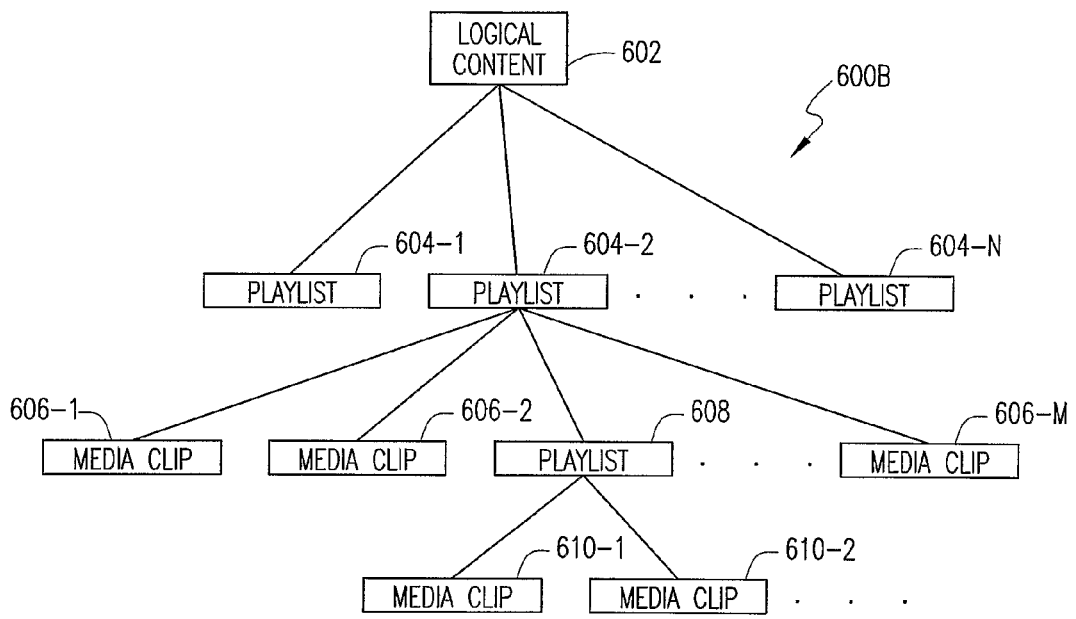
Figure 6C:
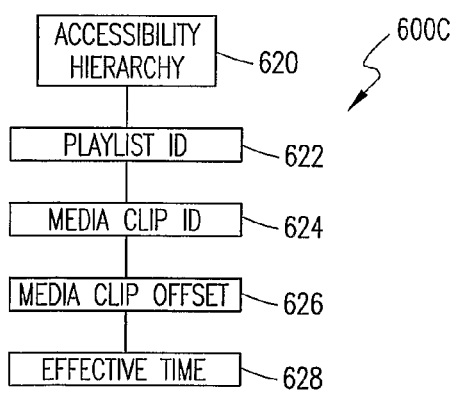

Referring to FIGS. 6A-6C, depicted therein are various aspects of an exemplary nested hierarchical arrangement of digital multimedia content associated with a network node that is accessed using a multidimensional pointer system of the present invention. Those skilled in the art should recognize that the network node in one implementation may comprise one or more server-side nodes that stream media (i.e., media servers) to which one or more web servers are coupled for effectuating a streaming transaction. In other words, the digital multimedia content may be spread across different databases although it is visualized herein as a single nested hierarchical arrangement with multiple levels.

Reference numeral 600A in FIG. 6A refers to an exemplary physical content hierarchy of the digital multimedia. As elaborated previously, physical content 602 may be comprised of playlists 605 and media clips 607. Reference numeral 600B in FIG. 6B refers to an exemplary logical content hierarchy associated with the digital media. Logical content 603 is comprised of a plurality of primary level playlist identifiers 604-1 through 604-N, each of which may comprise references to one or more media clips and/or one or more additional playlists (i.e., secondary playlists). Each secondary playlist reference may further include references to additional media clip references. As illustrated, playlist identifier 604-2 includes references 606-1 through 606-M to M media clips as well as a secondary playlist reference 608 which, in turn, includes references 610-1, 610-2 to further media clips, and so on.

In accordance with a presently preferred exemplary embodiment, a clip-level timing variable used in identifying a reference point within a particular clip may be described as an m-tuple correlate of the digital multimedia hierarchy wherein the content is arranged in a multi-level parent-child relationship, each level having its corresponding unique identifiers, as set forth above. In other words, the time axis is then separately attached to each individual block of the media at the lowest level, i.e., at the leaf node level, which in the hierarchy 600B comprises a media clip. As a generalization where the media content is organized into "n" nested levels (that is, Level (i) spans a number of Level (i−1) nodes, each of which in turn spans one or more Level (i−2) nodes, and so on, with each Level having its own unique identifier), a multidimensional pointer parameter is provided as an (n+1)-tuple:

$$\{[\text{Identifier}]_{[n]}; [\text{Identifier}]_{[n-1]}; [\text{Ideiztifier}]_{[n-2]}; \ldots; [\text{Identifier}]_{[1]}; [\text{time}]\}$$

wherein each lower level identifier further defines the media in the overall hierarchy. The clip-level time variable maybe defined to assume various values, ranging from the starting point of the identified clip to its ending point. Depending upon implementation, additionally, the time variable may be provided as a relative time offset with respect to a particular media block that is identified by the n media identifier dimensions (i.e., n-dimensional media identifier portion of the (n+1)-tuple).

Reference numeral 600C in FIG. 6C refers to an exemplary accessibility hierarchy associated with the server-side digital media that is in accordance with the teachings set forth above. To uniquely identify and access a particular block of media (e.g., a media clip) within an illustrative digital multimedia content database, accessibility hierarchy 620 resolves into a playlist identifier 622 and a media clip identifier 624. A media clip offset 626 may be used to specify at which point within the identified clip streaming should begin. Another timing parameter 628 (referred to as effective time or activation time) may be provided to determine when a client-initiated playlist navigation request is to be satisfied (e.g., NOW, END OF CLIP, and END OF PLAYLIST, or a time value based on a clock).

Figure 7:
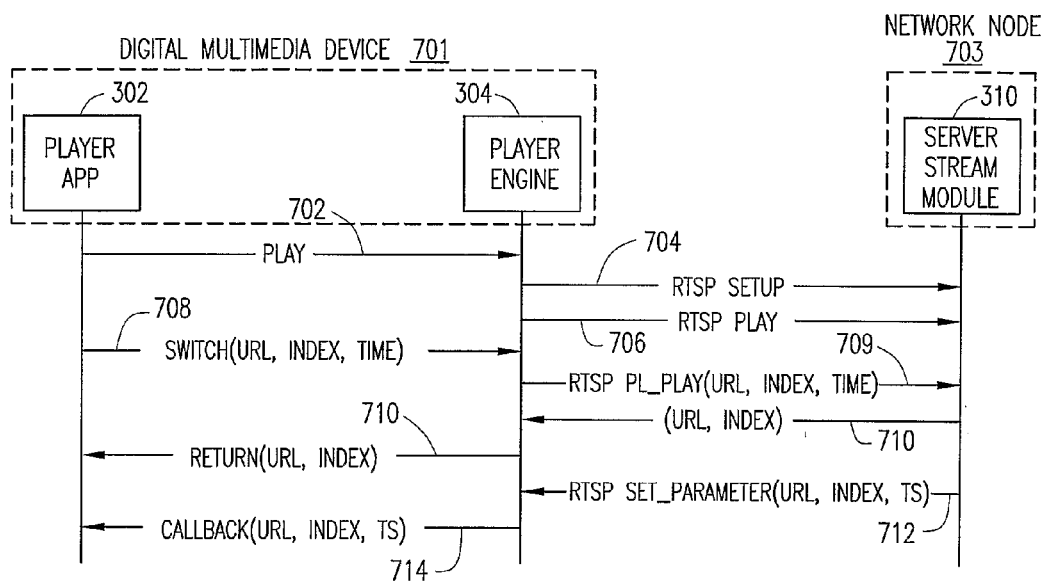
FIG. 7 depicts a message flow diagram associated with an embodiment for retrieving digital multimedia content from a network node.

During normal playback, the server-side network node (i.e., the streaming module integrated or associated with a web server) is operable to seamlessly open each successive content source file in the playlist and continue streaming without interruption, which is seen by the player engine as a continuous RTP session. FIG. 7 depicts a message flow diagram associated with an embodiment for retrieving digital multimedia content from a network node by skipping on-the-fly to a new media clip or to new server-side playlist (i.e., dynamic playlist updating or switching). Client player application 302 and associated player engine 304 are generalized into a digital multimedia device 701 which is disposed in a client-server arrangement with a generalized server-side network node 703 that includes streaming module 310. Upon propagating a PLAY message 702 from the player application 302 to its player engine 304 (via suitable application program interfacing), an RTSP SETUP message 704 is generated to the streaming module 310. Relatedly, an RTSP PLAY message 706 is transmitted to the streaming module 310 by the player engine 304, which then effectuates a streaming data delivery session therebetween. When requesting to skip to a new clip or switch to a new playlist, the client player application 302 sends a playlist navigation request, e.g., a SWITCH request 708, via suitable API to the player engine 304 which then sends an RTSP PLAYLIST_PLAY (or PL_PLAY in abbreviated form) 709 to the streaming module 310. As illustrated, the request includes a new range header containing a 3-tuple pointer parameter that identifies the requested playlist's URL, media clip index within the playlist, and a relative offset within the clip. Additionally, an effective time (i.e., when the request is to be active) is also included as a timing parameter. As alluded to before, in one implementation, acceptable values for the time at which to satisfy the request include NOW, END OF CLIP, and END OF PLAYLIST. A successful response 710 from the streaming module 310 simply echoes the modified range header, but without the activation time, which is propagated back to the client player application 302. An RTSP SET_PARAMETER call 712 is made by the streaming module 310, preferably substantially just as the actual playlist/clip transition occurs, in order to indicate the time value at which the switch to the next clip occurs (time=ts). Responsive thereto, a CALLBACK message 714 is propagated by the player engine 304 to the client player application 302 which maps [time=ts] to a Normal Play Time (NPT) timestamp.

FIG. 8 depicts request/response syntax structure associated with an exemplary PLAYLIST_PLAY procedure for switching to a server-side content source (either a new clip or a new playlist) according to an embodiment of the present invention. A PLAYLIST_PLAY request 802 includes in its range header a new range type called "playlist_play_time" that is a 3-tuple of the playlist URL, clip index and the relative offset (shown as a "0" in the example indicating starting at the beginning of the clip). Then there is the additional timing parameter representing the effective time (e.g., NOW) at which the request is to be satisfied. Reference numeral 804 refers to the response message from the streaming module as described above. A SET_PARAMETER request 806 is generated by the streaming module where the effective time is mapped to an NPT time to inform the client application as to when the streaming presentation from the identified content source can commence. With this information, the client player application can update the clip banner information accordingly. Additionally, the client player application is also provided with information to derive the RTP timestamp corresponding to the first RTP packet from the requested media source in the new playlist. An RTSP response 808 by the client player application is provided in response to the SET_PARAMETER request 806 upon successful completion of the messaging process.

When the user/client makes a request to skip to a new clip/playlist, but the streaming module encounters an error while attempting to begin streaming from the identified media source, an appropriate error code may be provided by the streaming module. FIG. 9 depicts a table 900 of exemplary return codes associated with the PLAYLIST_PLAY procedure according to an embodiment of the present invention. A "Symptoms" column 902 describes a number of conditions that correspond to various codes identified in the "Return Code" column 904 which may include implementation-specific numerical or alphanumeric codes. A "Behavior" column 906 describes the effect of each of the conditions that may be encountered in an exemplary PLAYLIST_PLAY procedure. For example, if the playlist file is not found, the prescribed behavior may be such that the streaming module continues streaming from the current playlist (i.e., the one playing when the playlist update request is propagated). Similar behavior modes may also be prescribed when the a secure playlist file is requested or if the requested playlist file is determined to be corrupt. Where the requested clip is determined to be corrupt, the behavior may be handled in the SET_PARAMETER request from the streaming server.

By way of illustration, when a dynamic playlist update is requested, the streaming module of the server-side node is operable to open the new content file, verify that it is valid, and prepare to switch to the identified media source at the time specified in the request. If the new playlist itself is valid, but clips are missing, streaming will continue with the next available clip in the playlist after the one for which the update request was made. In this case, the clip index value in the new range header in the PLAYLIST_PLAY response will indicate the next clip that will actually be streamed. If successive clips also contain errors, the streaming module is operable to continue to skip to the next clip in the requested playlist until either the last clip is reached, the playlist is updated, or a successful clip is found.

Based on the foregoing Detailed Description, it should be appreciated that the present patent disclosure advantageously provides the ability for a streaming client application to request a streaming server node to dynamically navigate within or across a playlist boundary. By characterizing the time parameter in terms of a multidimensional pointer, the navigation can be effectuated in the form of skipping to a media source within the same playlist, from another playlist file, and/or skipping to a different offset within a media source, either from the current playlist or a different playlist. Because of the nested playlist file composition, one can also create a playlist file to recursively include other playlist files. That is, a media source defined in a playlist can itself be composed of other media sources defined in another playlist altogether. Those skilled in the art will recognize that this powerful concept gives rise to many application flexibilities in multimedia streaming regardless of the underlying streaming architecture (e.g., Real media, Windows Media, QuickTime, et cetera). Furthermore, it should be recognized that the teachings of the present disclosure may be practiced in conjunction with other client/server protocols such as Session Initiation Protocol (SIP), H.323, etc.

Although the invention has been described with reference to certain exemplary embodiments, it is to be understood that the forms of the invention shown and described are to be treated as exemplary embodiments only. Accordingly, various changes, substitutions and modifications can be realized without departing from the spirit and scope of the invention as defined by the appended claims.

What is claimed is:

1. A method for retrieving digital multimedia content from a network node, comprising:
   receiving a Real-Time Streaming Protocol (RTSP)-compliant PLAYLIST_PLAY navigation message, that includes at least one (n+1) tuple, multidimensional pointer, at said network node, said multidimensional pointer associated with a media clip in a depository of digital multimedia content that is organized into a nested hierarchical arrangement having a plurality of levels that correspond to respective media identifier dimensions of said RTSP multidimensional pointer, said navigation message further including a relative time offset within said media clip, and a timing parameter operable to indicate when said navigation message is to be activated by said network node; and
   transferring digital multimedia content to a digital multimedia device by said network node from a particular content source identified by said multidimensional pointer, said transferring commencing at a time indicated responsive to said timing parameter.

2. The method for retrieving digital multimedia content from a network node as recited in claim 1, wherein a first level of said depository of digital multimedia content comprises at least one server-side playlist identified by a uniform resource locator.

3. The method for retrieving digital multimedia content from a network node as recited in claim 2, wherein said at least one server-side playlist includes one or more media clips, each being identified by a corresponding media source identifier and a relative time offset within said media clip.

4. The method for retrieving digital multimedia content from a network node as recited in claim 1, wherein said digital multimedia device accesses said network node over at least one of a wireline network, a wireless network, or a cable network.

5. The method for retrieving digital multimedia content from a network node as recited in claim 1, wherein said digital multimedia device comprises at least one of: digital music players, digital video players, computers, or handheld communication devices enabled to accept streaming media.

6. The method for retrieving digital multimedia content from a network node as recited in claim 1, wherein said timing parameter is operable to assume a value selected from the group consisting of: NOW, END OF CLIP, and END OF PLAYLIST.

7. The method as in claim 1 wherein the Real-Time Streaming Protocol (RTSP)-compliant PLAYLIST_PLAY navigation message, that includes at least one (n+1) tuple, multidimensional pointer, comprises a 3-tuple of a playlist URL, clip index and the relative time offset.

8. A system for retrieving digital multimedia content from a network node, comprising:
   means for receiving a Real-Time Streaming Protocol (RTSP)-compliant PLAYLIST_PLAY navigation message, that includes at least one (n+1) tuple, multidimensional pointer, at said network node, said at least one multidimensional pointer associated with a media clip in a depository of digital multimedia content that is organized into a nested hierarchical arrangement having a plurality of levels that correspond to respective media identifier dimensions of said RTSP multidimensional pointer, said navigation message further including a relative time offset within said media clip, and a timing parameter operable to indicate when said navigation message is to be activated by said network node; and means for transferring digital multimedia content to said digital multimedia device by said network node from a particular content source identified by said multidimensional pointer, said transferring commencing at a time indicated responsive to said timing parameter.

9. The system for retrieving digital multimedia content from a network node as recited in claim 8, wherein a first level of said depository of digital multimedia content comprises at least one server-side playlist identified by a uniform resource locator.

10. The system for retrieving digital multimedia content from a network node as recited in claim 9, wherein said at least one server-side playlist includes one or more media clips, each being identified by a corresponding media source identifier and a relative time offset within said media clip.

11. The system for retrieving digital multimedia content from a network node as recited in claim 8, wherein said digital multimedia device is operable to access said network node over at least one of a wireline network, a wireless network, or a cable network.

12. The system for retrieving digital multimedia content from a network node as recited in claim 8, wherein said digital multimedia device comprises at least one of: digital music players, digital video players, computers, or handheld communication devices enabled to accept streaming media.

13. The system for retrieving digital multimedia content from a network node as recited in claim 8, wherein said timing parameter is operable to assume a value selected from the group consisting of: NOW, END OF CLIP, and END OF PLAYLIST.

14. The system as in claim 8 wherein the Real-Time Streaming Protocol (RTSP)-compliant PLAYLIST_PLAY navigation message, that includes at least one (n+1)_tuple, multidimensional pointer, comprises a 3-tuple of a playlist URL, clip index and the relative time offset.

15. A digital multimedia device operable to retrieve digital multimedia content from a network node, comprising:

logic for receiving a Real-Time Streaming Protocol (RTSP)-compliant PLAYLIST_PLAY navigation message, that includes at least one (n+1) tuple, multidimensional pointer, at said network node, said message containing at least one multidimensional pointer associated with a media clip in a depository of digital multimedia content that is organized into a nested hierarchical arrangement having a plurality of levels that correspond to respective media identifier dimensions of said RTSP multidimensional pointer, said navigation message further including a relative time offset within said media clip, and a timing parameter operable to indicate when said navigation message is to be activated by said network node; and a player engine operable to play back streaming content from a particular content source identified by said multidimensional pointer, said streaming content commencing at a time indicated responsive to said timing parameter.

16. The digital multimedia device operable to retrieve digital multimedia content from a network node as recited in claim 15, wherein a first level of said plurality of media identifier dimensions comprises a uniform resource locator identifying a server-side playlist.

17. The digital multimedia device operable to retrieve digital multimedia content from a network node as recited in claim 16, wherein a second level of said plurality of media identifier dimensions comprises at least one of a media source identifier for identifying a particular media clip within said server-side playlist or another server-side playlist identifier.

18. The digital multimedia device operable to retrieve digital multimedia content from a network node as recited in claim 15, wherein said multidimensional pointer includes the relative time offset within said media clip.

19. The digital multimedia device operable to retrieve digital multimedia content from a network node as recited in claim 15, further comprising means for accessing said network node over at least one of a wireline network, a wireless network, or a cable network.

20. The digital multimedia device operable to retrieve digital multimedia content from a network node as recited in claim 15, wherein said timing parameter is operable to assume a value selected from the group consisting of: NOW, END OF CLIP, and END OF PLAYLIST.

21. The device as in claim 15 wherein the the Real-Time Streaming Protocol (RTSP)-compliant PLAYLIST_PLAY navigation message, that includes at least one (n+1)_tuple, multidimensional pointer, comprises a 3-tuple of a playlist URL, clip index and the relative time offset.

* * * * *